US012072725B2

(12) United States Patent
Faur et al.

(10) Patent No.: US 12,072,725 B2
(45) Date of Patent: Aug. 27, 2024

(54) LOW NOISE BIPOLAR HIGH VOLTAGE REGULATOR

(71) Applicant: DH Technologies Development PTE. LTD., Singapore (SG)

(72) Inventors: Manuel Faur, Richmond Hill (CA); Ernesto Gradin, York (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 264 days.

(21) Appl. No.: 17/762,244

(22) PCT Filed: Sep. 24, 2020

(86) PCT No.: PCT/IB2020/058906
§ 371 (c)(1),
(2) Date: Mar. 21, 2022

(87) PCT Pub. No.: WO2021/059169
PCT Pub. Date: Apr. 1, 2021

(65) Prior Publication Data
US 2022/0382310 A1 Dec. 1, 2022

Related U.S. Application Data

(60) Provisional application No. 62/905,038, filed on Sep. 24, 2019.

(51) Int. Cl.
*G05F 1/595* (2006.01)
*G05F 1/575* (2006.01)

(52) U.S. Cl.
CPC .............. *G05F 1/595* (2013.01); *G05F 1/575* (2013.01)

(58) Field of Classification Search
CPC ........... G05F 1/563; G05F 1/575; G05F 1/595
See application file for complete search history.

(56) References Cited

U.S. PATENT DOCUMENTS 3,571,604 A 3/1971 Porta et al.
6,490,142 B1 * 12/2002 Smith .................... G05F 1/613 361/104

(Continued)

FOREIGN PATENT DOCUMENTS

CN 106843353 B 3/2019
WO 02/097549 A1 12/2002

OTHER PUBLICATIONS

International Search Report mailed Dec. 22, 2020 in corresponding PCT App. No. PCT/IB2020/058906 (3 pages).

(Continued)

*Primary Examiner* — Alex Torres-Rivera
(74) *Attorney, Agent, or Firm* — Potomac Law Group, PLLC; Reza Mollaaghababa; Brian Hairston

(57) ABSTRACT

In one aspect, a voltage regulator is disclosed, which comprises a first voltage regulator unit configured for regulating a voltage generated by a positive high voltage source, a second voltage regulator unit configured for regulating a voltage generated by a negative high voltage source, a polarity switch for connecting said first and second voltage regulator units to said positive and negative high voltage sources, respectively, and an output voltage port for receiving a regulated positive and negative high voltage from said first and said second voltage regulator units, respectively.

20 Claims, 4 Drawing Sheets

(56) References Cited

U.S. PATENT DOCUMENTS

| | | | | |
|---|---|---|---|---|
| 6,713,991 | B1 | 3/2004 | McCallum | |
| 8,902,678 | B2 * | 12/2014 | Dimartino | G05F 1/575 365/230.06 |
| 2008/0143309 | A1 * | 6/2008 | Odell | H02M 3/1588 323/231 |

OTHER PUBLICATIONS

Written Opinion of the International Searching Authority mailed Dec. 22, 2020 in corresponding PCT App. No. PCT/IB2020/058906 (7 pages).

* cited by examiner

LOW NOISE BIPOLAR HIGH VOLTAGE REGULATOR

RELATED APPLICATION

This application is the national stage of International Application No. PCT/IB2020/058906 filed on Sep. 24, 2020, entitled "Low Noise Bipolar High Voltage Regulator," which claims priority to U.S. provisional application No. 62/905,038 filed on Sep. 24, 2019, entitled "Low Noise Bipolar High Voltage Regulator," which are incorporated herein in their entireties.

BACKGROUND

The present teachings are generally related to voltage regulators and more specifically to voltage regulators that can be used in mass spectrometry systems.

Mass spectrometry systems employ high voltages for operating a variety of system components. For example, in time-of-flight mass spectrometers, high voltages are employed for accelerating ions and as bias voltages for ion mirrors.

Voltage regulators for regulating voltages supplied by high voltage sources of mass spectrometers are known. Such conventional voltage regulators, however, suffer from a number of shortcomings. For example, conventional voltage regulators exhibit large power losses, which present challenges for thermal management of these regulators. In particular, most high voltage regulator circuits are encapsulated in a sealed housing in order to permit their operation at high voltages. Such encapsulation of the circuits render heat dissipation difficult, thus presenting challenges for thermal management of the voltage regulators.

For example, FIG. 1 schematically depicts a conventional shunt regulator that exhibits significant power dissipation and poor rise and fall time. FIG. 2 schematically depicts a conventional series voltage regulator that due to unavailability of sufficiently high voltage transistors needed in high-voltage applications requires multiple transistors connected in series to be able to handle a high differential voltage between its input and its output.

Accordingly, there is a need for high-voltage regulators that exhibit a low power dissipation as well as high stability and low noise.

SUMMARY

In one aspect, a voltage regulator is disclosed, which comprises a first voltage regulator unit configured for regulating a voltage generated by a positive high voltage source, a second voltage regulator unit configured for regulating a voltage generated by a negative high voltage source, a polarity switch for connecting said first and second voltage regulator units to said positive and negative high voltage sources, respectively, and an output voltage port for receiving a regulated positive and negative high voltage from said first and said second voltage regulator units, respectively. Each of the voltage regulator units comprises a voltage-regulating transistor configured to regulate one of the positive and negative polarity voltages. A Zener diode is electrically connected in parallel to the voltage-regulating transistor so as to provide a low impedance bypass path around said voltage-regulating transistor when the voltage-regulating transistor is coupled via said polarity switch to one of said voltage sources providing a voltage having a polarity opposite to the voltage polarity associated with said voltage-regulating transistor. Further, for each of the first and second voltage regulator units, a feedback path extends from the output voltage port to a base of the voltage-regulating transistor associated with the voltage regulator unit for modulating a current applied to the transistor base so as to adjust conductivity of said voltage-regulating transistor and hence an output voltage generated at said output voltage port.

Any of the first and the second voltage regulator units comprises at least one shunt transistor disposed between the base of the voltage-regulating transistor of that voltage regulator unit and the ground. The base of the shunt transistor can be coupled to the output voltage port via a respective one of the feedback paths to allow application of a feedback signal thereto.

In some embodiments, the at least one shunt transistor comprises a plurality of shunt transistors that are electrically coupled in series with one another. The last shunt transistor in the series is coupled to the electric ground, either directly or via a resistor. One of the feedback paths is coupled to the base of this shunt transistor to apply a feedback signal thereto for modulating its conductance.

A resistive voltage divider, which comprises a plurality of resistors connected in series, is electrically disposed between an input port of the voltage-regulating transistor and the electric ground. The base of each of the plurality of shunt transistors that are coupled in series, other than the base of the last shunt transistor, is electrically coupled to a junction between two of said plurality of resistors of the resistive voltage divider such that a fraction of a voltage applied to a terminal of said resistive voltage divider is applied to the base of that shunt transistor.

In some embodiments, a first diode is disposed in series with the resistive voltage divider and a second diode is disposed in a path connecting the base of the voltage-regulating transistor to ground, where each diode is configured to activate and deactivate the voltage-regulating transistor and the shunt transistors based on polarity of voltage at said output voltage port.

In some embodiments, the voltage regulator can further include an output resistive voltage divider for receiving an output voltage of any of the first and the second voltage-regulating units and providing a fraction of the received voltage at the output voltage port of the voltage regulator.

In some embodiments, the voltage regulator can further include a pair of comparators each of which is associated with one of the feedback paths. Each comparator is configured to compare an output voltage at the output voltage port of the voltage regulator with a predefined voltage and to generate a feedback signal based on that comparison. In some embodiments, the voltage regulator can further include a first high-voltage control circuit for controlling the positive high-voltage source and a second high-voltage control circuit for controlling the negative high-voltage source.

In a related aspect, a voltage regulator for use in a mass spectrometry system is disclosed, which comprises a first voltage regulator unit having a first voltage-regulating transistor configured for regulating a voltage generated by a positive high-voltage source, and a second voltage regulator unit having a second voltage-regulating transistor configured for regulating a voltage generated by a negative high-voltage source. The voltage regulator further includes a polarity switch for connecting the first and the second voltage regulator units to the positive and negative high voltage sources, respectively. The voltage regulator further includes an output voltage port for receiving a regulated positive and negative high voltage from said first and said second voltage regulator units, respectively. A first shunt regulator is configured for controlling the first voltage regulator unit, and a second shunt regulator is configured for controlling the second voltage regulator unit. A first feedback path extends from said output voltage port to the first shunt regulator for providing a first feedback signal thereto, where said first shunt regulator is configured to adjust conductance of said first voltage-regulating transistor in response to the feedback signal so as to regulate the positive voltage at said output voltage port. A second feedback path extends from said output voltage port to the second shunt regulator unit for providing a second feedback signal thereto, where said second shunt regulator unit is configured to adjust conductance of said second voltage-regulating transistor in response to said feedback signal so as to regulate said negative voltage at said output voltage port.

In some embodiments, the first shunt regulator unit can include a plurality of transistors connected in series between a base of said first voltage-regulating transistor and the electric ground. Further, the second shunt regulator unit can include a plurality of transistors connected in series between a base of said second voltage-regulating transistor and the electric ground.

In some embodiments, the first shunt regulator unit can further include a first voltage divider connected between an input port of said first voltage-regulating transistor and the electric ground for applying to each of a subset of said transistors of the first shunt regulator unit a different fraction of a voltage applied to the input port of the voltage divider.

In some embodiments, the second shunt regulator unit includes a second voltage divider connected between an input port of said second voltage-regulating transistor and the electric ground for applying to each of a subset of said transistors of the second shunt regulator unit a different fraction of a voltage applied to the input port of the voltage divider.

In some embodiments, a first diode is disposed between the base of said first voltage-regulating transistor and the plurality of transistors of the first shunt regulator unit so as to activate and deactivate said first voltage-regulating transistor based on a voltage at said voltage output port. A second diode is disposed in series with said first voltage divider and is configured to activate and deactivate the transistors of the first shunt regulator unit based on a voltage at said voltage output port. Further, in some embodiments, a third diode is disposed between the base of said second voltage-regulating transistor and the plurality of transistors of the second shunt regulator unit so as to activate and deactivate said second voltage-regulating transistor based on a voltage at said voltage output port. A fourth diode can be disposed in series with said second voltage divider for activating and deactivating the transistors of said second shunt regulator based on a voltage at said voltage output port.

Further understanding of various aspects of the present teachings can be obtained by reference to the following detailed description in conjunction with the associated drawings, which are briefly described below.

DETAILED DESCRIPTION

The present teachings provide a low-power dissipation high-voltage regulator, which can operate in both positive and negative polarity and can maintain a controlled differential voltage between its input and output. In some embodiments, such a voltage regulator can be implemented using low-voltage and low-power transistors, which can in turn limit the power dissipation exhibited by the voltage regulator. For example, in some such embodiments, the voltage regulator can exhibit a power dissipation that is less than about 0.5 Watts. As discussed in more detail below, in such a voltage regulator, the output voltage is adjustable and the voltage regulator includes a positive-voltage and a negative-voltage regulating element that can maintain the output voltage within an acceptable tolerance of a desired value.

Figure 1:
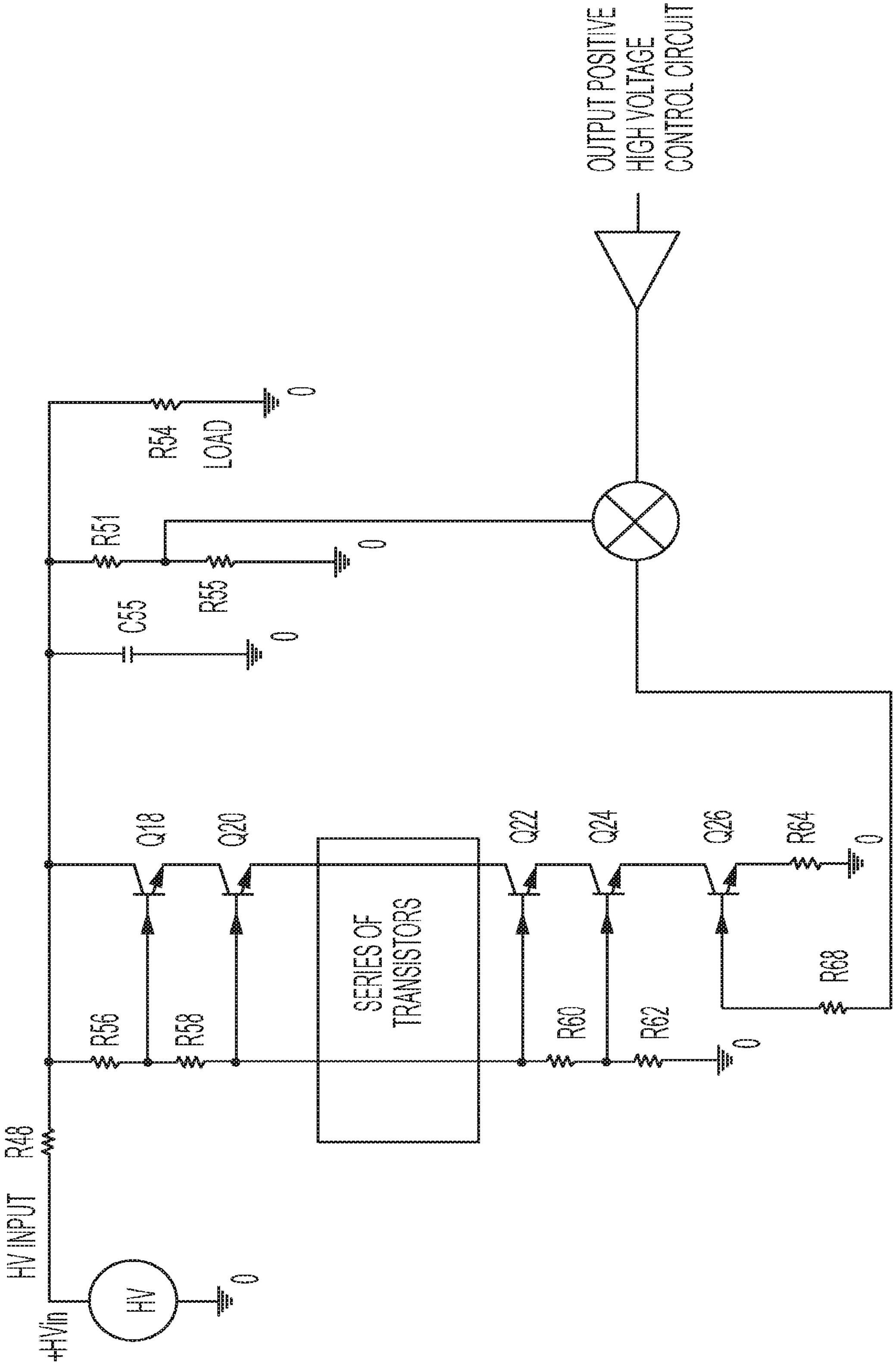
FIG. 1 PRIOR ART
FIG. 1 schematically depicts a prior art voltage regulator.
Figure 2:
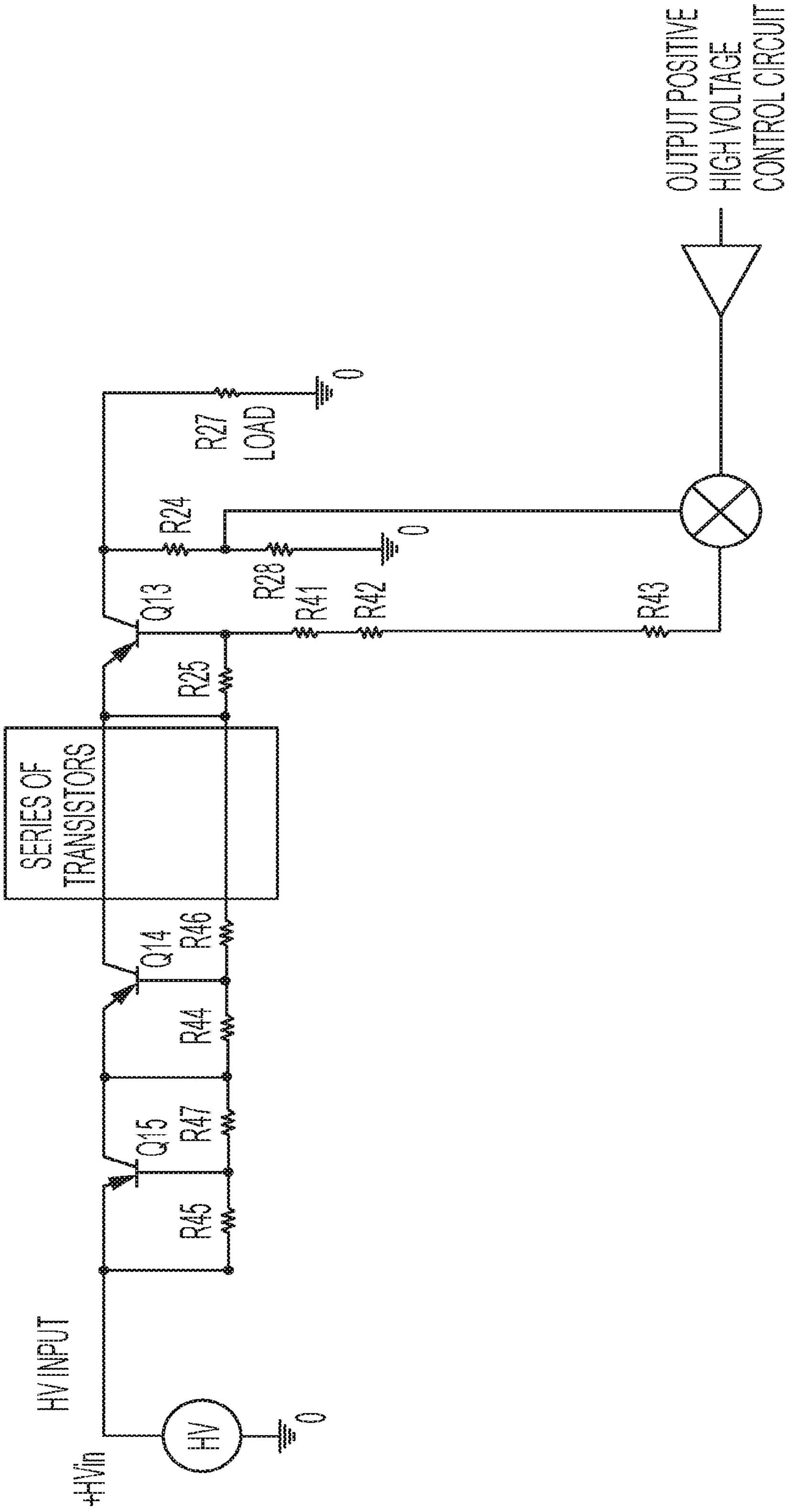
FIG. 2 PRIOR ART
FIG. 2 schematically depicts another prior art voltage regulator.
Figure 3:
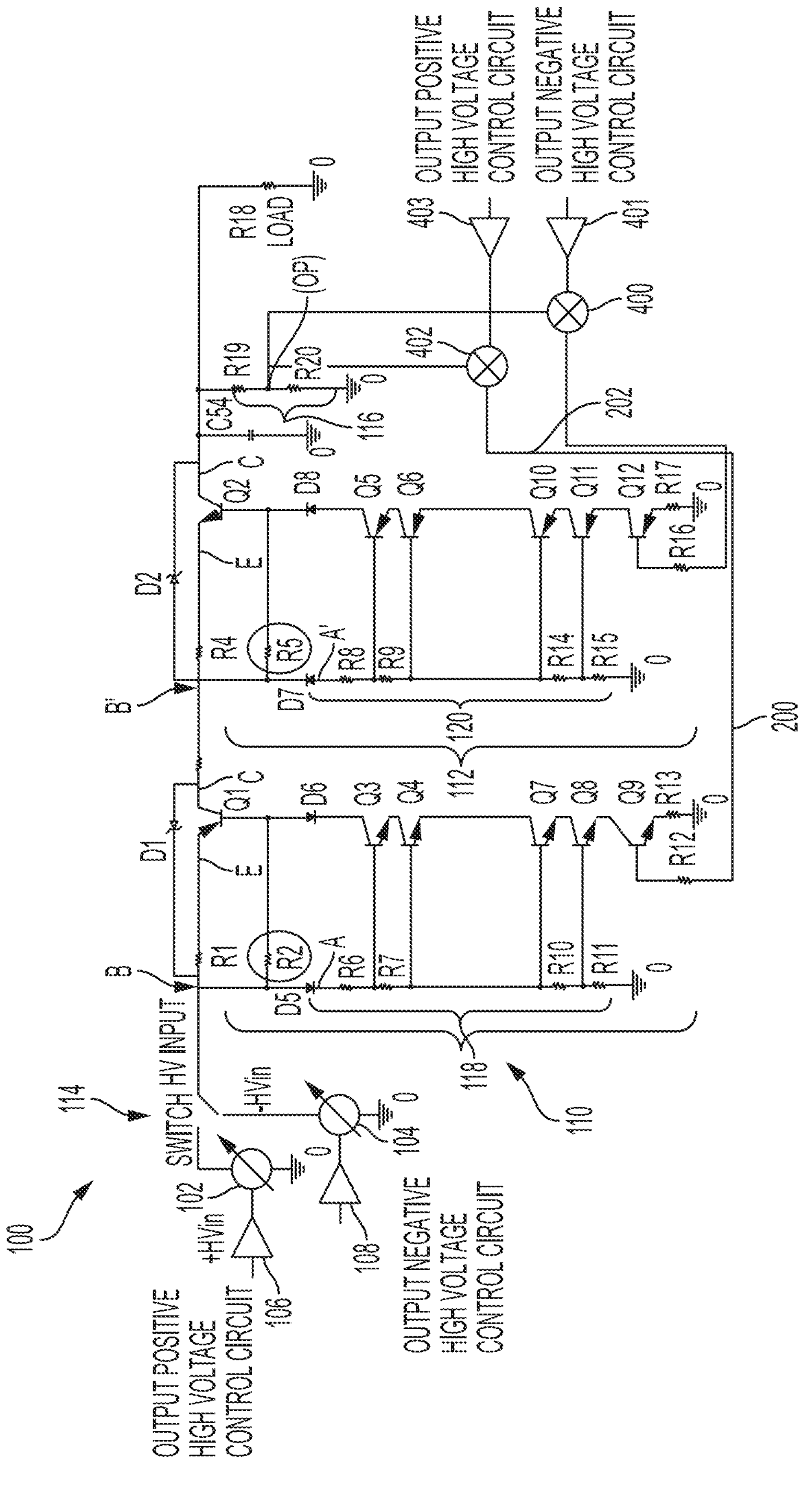
FIG. 3 schematically depicts a voltage regulator according to an embodiment, and FIG. 4 schematically depicts a mass spectrometry system in which a voltage regulator according to an embodiment is employed.

FIG. 3 schematically depicts a voltage regulator 100 according to an embodiment of the present teachings, which includes a positive high-voltage source 102 and a negative high-voltage source 104. Two high-voltage control units 106 and 108 control, respectively, the voltage sources 102 and 104.

The voltage regulator 100 includes two shunt regulators 110 and 112, which can regulate the positive and the negative voltages at the output of the voltage regulator 100, in a manner discussed in more detail below (the shunt regulator 110 is herein referred to as "positive shunt regulator" and the shunt regulator 112 is herein referred to as "negative shunt regulator").

The voltage regulator 100 includes a polarity switch 114 that allows electrically connecting the input ports of the shunt regulators to the positive or the negative voltage sources 102 and 104.

As discussed in more detail below, each of the shunt regulators 110 and 112 includes a voltage-regulating transistor whose conductance can be adjusted based on a feedback signal generated in response to an output voltage of the regulator so as to regulate the output voltage within a desired range.

More specifically, the shunt regulator 110 regulates positive input voltages and includes a voltage-regulating transistor Q1, which is a pnp bipolar transistor that is electrically coupled in series at its emitter port E to one terminal of the resistor R1 whose other terminal is electrically coupled to the polarity switch 114 to receive a positive or a negative high voltage from the positive or the negative voltage sources 102 and 104, respectively, based on the position of the polarity switch.

As the shunt regulator 110 is configured to regulate a positive voltage generated by the positive voltage source 102, Zener diode D1 is coupled in parallel with the combination of resistor R1 and the voltage-regulating transistor Q1 to provide a low-impedance bypass path around the voltage-regulating transistor Q1 when the polarity switch is set in a negative-voltage position. More specifically, the Zener diode D1 is in a non-conducting state (i.e., in the reverse bias region) when the polarity switch is set in a positive-voltage position so that the shunt regulator 110 will regulate the voltage supplied by the positive high-voltage source. In contrast, when the polarity switch is set in a negative-voltage position, the voltage across the Zener diode can cause the diode to operate in the forward bias region and the diode can start conducting once the voltage across it exceeds the forward bias voltage (typically about 0.6 volts). Thus, Zener diode D1 can provide a low-impedance path around the voltage-regulating transistor Q1 such that the negative high-voltage supplied by the voltage source 104 can be applied to the negative-voltage shunt regulator 112.

The negative shunt regulator 112 includes a voltage-regulating transistor Q2, which is an npn bipolar transistor in this embodiment and is electrically coupled in series at its emitter port E to one terminal of the resistor R4 whose other terminal is electrically coupled to a terminal of resistor R3, which is disposed in series between the positive and the negative shunt regulators 110 and 112.

As the shunt regulator 112 is configured for regulating a negative voltage generated by the negative voltage source 104, Zener diode D2 is coupled in parallel with the combination of resistor R4 and the voltage-regulating transistor Q2 to allow the negative voltage regulator 112 to regulate the negative voltage when the polarity switch is set in the negative voltage position and to bypass the negative voltage regulator 112 when the polarity switch is set in the positive voltage position.

More specifically, Zener diode D2 is in a non-conducting state (i.e., in the reverse bias region) when the polarity switch is set in a negative-voltage position so that the shunt regulator 112 will regulate the negative high voltage supplied by the negative high-voltage source 104. In contrast, when the polarity switch is set in a positive-voltage position, the voltage across the Zener diode can cause the diode to operate in the forward bias region and the diode can start conducting once the voltage across it exceeds the forward bias voltage (typically about 0.6 volts). Thus, in this conducting configuration, Zener diode D2 can provide a low-impedance path around the voltage-regulating transistor Q2 such that the positive high-voltage supplied by the voltage source 102 can be applied to the positive-voltage shunt regulator 110.

In this embodiment, diodes D1 and D2 are high-voltage surge suppressors that serve to not only bypass transistors Q1 and Q2 when the polarity of the input voltage is opposite to the polarity associated with operation of Q1 and Q2, but also to protect the voltage-regulating transistors Q1 and Q2 by clamping the maximum voltage across these transistors below their respective breakdown voltages.

Referring again to the positive shunt regulator 110, a diode D6, a plurality of shunt transistors (Q3, Q4, Q7, Q8, Q9), and resistor R13 provide a path via which the conductance of the voltage-regulating transistor Q1 can be modulated in response to a feedback signal generated based on the output voltage of the voltage regulator, in a manner discussed in more detail below.

High voltage diode D6 can activate and deactivate the voltage-regulating transistor based on the polarity of the voltage applied to the voltage regulator. A resistor R5 electrically couples diode D8 to terminal B' of resistor R3. The voltage at this terminal can activate or deactivate the diode based on the polarity of the input voltage. More specifically, when the applied voltage is a positive voltage, diode D6 can activate the voltage-regulating transistor and when the applied voltage is a negative voltage, diode D6 can deactivate the voltage-regulating transistor.

A positive-voltage feedback path 200 couples the output of a comparator 402 to the base of the shunt transistor Q9, via resistor R12, so as to allow providing a feedback signal to the base of the shunt transistor Q9. The comparator 402 receives, at one input port, the voltage at the output port of the voltage regulator, which is set by a voltage divider 116 consisting of resistors R19 and R20, and receives at its other input port a set voltage defined by a positive high voltage control circuit 403. The comparator compares the two voltages and applies a feedback signal to the base of the shunt transistor Q9. As discussed in more detail below, the feedback signal applied to the shunt transistor Q9 can modulate its conductivity and hence the current flowing from the emitter terminal E to collector terminal C of transistor Q1 and from the collector terminal C to the voltage divider 116, thus adjusting the voltage at output voltage port (OP) of the voltage regulator.

A resistive voltage divider 118 applies different fractions of the voltage applied to its input terminal A to the bases of the shunt transistors Q3, Q4, Q7, and Q8. More specifically, in this embodiment, an electrical path comprising diode D5, resistors R6, R7, R10 and R11 connects terminal B of resistor R1 to the electric ground. Diode D5 activates and deactivates the shunt transistors Q3, Q4, Q7, and Q8 based on the polarity of the voltage applied to terminal B of resistor R1. More specifically, when terminal B of resistor R1 is connected to the positive high-voltage source 102, diode D1 will be in a conducting state and hence will allow application of fractions of the voltage applied to terminal B of the shunt voltage divider 118 to the bases of the transistors Q3, Q4, Q7 and Q8. Thus, when diode D5 is in a conducting state, the voltages applied to the bases of Q3, Q4, Q7, and Q8 will cause these transistors to be in a conducting state, thereby providing a path for the flow of current between the base of the voltage-regulating transistor Q1, via the transistor Q9, to the ground.

Referring now to the negative shunt regulator 112, this shunt regulator is configured similar to the shunt regulator 110 but for regulating negative, rather than positive, voltages. Specifically, the negative shunt regulator 112 includes a voltage-regulating transistor Q2, which in this embodiment is a npn bipolar transistor that is electrically coupled in series at its emitter port B' to one terminal of resistor R4 whose other terminal is electrically coupled to resistor R3, which is disposed between the positive voltage regulator 110 and the negative voltage regulator 112.

As the shunt regulator 112 is configured for regulating a negative voltage generated by the negative voltage source 104, Zener diode D2 is coupled in parallel with the combination of resistor R4 and the voltage-regulating transistor Q2 to provide a low-impedance bypass path around the voltage-regulating transistor Q2 when the polarity switch is set in a positive-voltage position. More specifically, Zener diode D2 is in a non-conducting state (i.e., in the reverse bias region) when the polarity switch is set in a negative-voltage position so that the shunt regulator 112 will regulate the voltage supplied by the negative high-voltage source. In contrast, when the polarity switch is set in a positive-voltage position, the voltage across the Zener diode can cause the diode to operate in the forward bias region and the diode can start conducting once the voltage across it exceeds the forward bias voltage (typically about 0.6 volts). Thus, in such a conducting state, Zener diode D2 can provide a low-impedance path around the voltage-regulating transistor Q2 such that the positive high-voltage supplied by the voltage source 102 can be regulated by the positive voltage regulator 110.

Diode D8, a plurality of shunt transistors (Q5, Q6, Q10, Q11, Q12), and resistor R17 provide a path via which the conductance of the voltage-regulating transistor Q2 can be modulated in response to a feedback signal generated based on the output voltage of the voltage regulator, in a manner discussed in more detail below.

Diode D8 can activate and deactivate the voltage-regulating transistor Q2 based on the polarity of the voltage applied to the voltage regulator. A resistor R5 couples diode D8 to terminal B' of resistor R4. The voltage at this terminal can then activate or deactivate the diode based on the polarity of the input voltage. When the applied voltage is a negative voltage the diode D8 can activate the voltage-regulating transistor and when the applied voltage is a positive voltage, the diode D8 can deactivate the voltage-regulating transistor.

A resistive voltage divider 120 applies different fractions of the voltage applied to terminal A' thereof to the bases of the shunt transistors Q5, Q6, Q10, and Q11. More specifically, in this embodiment, an electrical path comprising diode D7, and resistors R8, R9, R14 and R15 connects a terminal of resistor R4 to the electric ground. Diode D7 activates and deactivates the shunt transistors Q5, Q6, Q10, and Q11 based on the polarity of the input voltage.

A negative-voltage feedback path 202 couples the output of a comparator 400 to the base of the shunt transistor Q12 so as to allow applying a feedback signal to the base of the shunt transistor Q12. The comparator 400 receives, at one input port, the voltage at the output port (OP) of the voltage regulator, which is set, as discussed above, by a voltage divider consisting of resistors R19 and R20, and receives at its other input port a set voltage defined by a negative high voltage control circuit 403. The comparator compares the two voltages and applies a feedback signal to the base of the shunt transistor Q12. The feedback signal applied to the shunt transistor Q12 can modulate its conductivity and hence the current flowing through the base of the voltage-regulating transistor Q2, which in turn adjusts the conductance of transistor Q2 and hence regulates the output voltage on the load R18.

More specifically, when the polarity switch 114 is set in a negative-voltage state, i.e., when the polarity switch 114 couples the negative voltage regulator units to the negative voltage source 104, diode D1 of the positive voltage regulator 110 will be in a conducting state, thus allowing application of the negative voltage to the negative voltage regulator 112. The application of the negative voltage to the negative voltage regulator 112 will cause diode D7 to transition into a conducting state and hence allow the application of fractions of a voltage applied to terminal B' of resistor R4 to the bases of the transistors Q5, Q6, Q10, and Q11, thus activating these transistors. Thus, when diode D7 transitions into a conducting state, fractions of the voltage applied to the top terminal of the resistive voltage divider 120 are applied to the bases of these transistors to activate them, thereby allowing current flow between the base of the voltage-regulating transistor Q2 and the electric ground.

As noted above, in this embodiment, a resistive voltage divider consisting of resistors R19 and R20 is provided at the output of the voltage regulator, where the output voltage port (OP) of the voltage regulator is at the junction between resistors R19 and R20. In this embodiment, capacitor C54 is a ripple filter capacitor and resistor R18 represents the load and they are coupled electrically in parallel with the voltage divider.

In use, control circuits 106 and 108 set the input voltage levels supplied by the positive and the negative voltage sources 102 and 104 such that the voltage-regulating transistors Q1 and Q2 would operate in the linear mode. The feedback signals applied via the feedback paths 200 and 202 to shunt transistors Q9 and Q12 described above control the current circulating via emitters of transistors Q9 or Q12, based on the polarity of the input voltage. This can in turn control the conductance of the voltage-regulating transistors Q1 and Q2 and hence adjust the voltage level at the output voltage port (OP).

More specifically, when the input voltage is positive, transistor Q1 is active in linear mode and provides the regulation of the applied voltage. In such a mode, transistor Q2 is bypassed by Zener diode D1 that would be operating in the forward bias mode. Further, diodes D5 and D6 will be biased in the forward bias mode and will hence enable the corresponding shunt regulator transistors that control the conductance of the voltage-regulating transistor Q1, which can in turn control the current flow therethrough and hence the current flow through the output voltage divider 116.

For negative input voltages, transistor Q1 is bypassed by diode D1 and the voltage-regulating transistor Q2 operates to regulate the output voltage. In such a mode, diodes D5 and D6 are biased in reverse, thus effectively disconnecting the positive shunt regulator from the circuit. Diodes D7 and D8 are forward biased to allow the negative shunt regulator to control the conductance of the voltage-regulating transistor Q2, which in turn controls the flow of current therethrough and hence the current flow to the output voltage divider 116.

More specifically, the feedback signals applied to Q9 and Q12 control the current circulating via the emitters of Q9 and Q12, depending on the polarity of the input voltage by changing the voltage applied to the base of each of these transistors. The voltages on resistors R13 and R17 will follow the base voltages minus the base emitter voltage drop of approximately 600 mV. As the emitter currents of Q9 and Q12 circulate via resistors R13 and R17, they are controlled by the voltages applied to these resistors. Further, since in high-gain transistors, emitter current is approximately equal to the collector current, these currents will circulate through the emitters and collectors of all transistors in the shunt regulators (i.e., Q3 to Q9 for the positive shunt regulator and Q5 to Q12 for the negative shunt regulator). The current circulating through Q3 to Q9 will be shared by R2 and the base of Q1 and the current circulating through Q5 to Q12 will be shared by R5 and the base of Q2. By modifying the base currents of Q1 and Q2, the collector currents of Q1 and Q2 can be controlled as the collector currents are related to the base currents by the gains of these transistors.

Thus, the current applied to the output voltage divider 116 is regulated via voltage-regulating transistors Q1 and Q2 in order to maintain the voltage regulator's output voltage at a desired level (i.e., within an acceptable variation range).

A high-voltage regulator according to the present teachings provides a number of advantages. For example, such a high-voltage regulator can regulate positive and negative voltages while using a single voltage divider at its output. Further, it employs low-voltage, low-current transistors, which limit heat generated during the operation of the voltage regulator, thus facilitating thermal management thereof.

Figure 4:
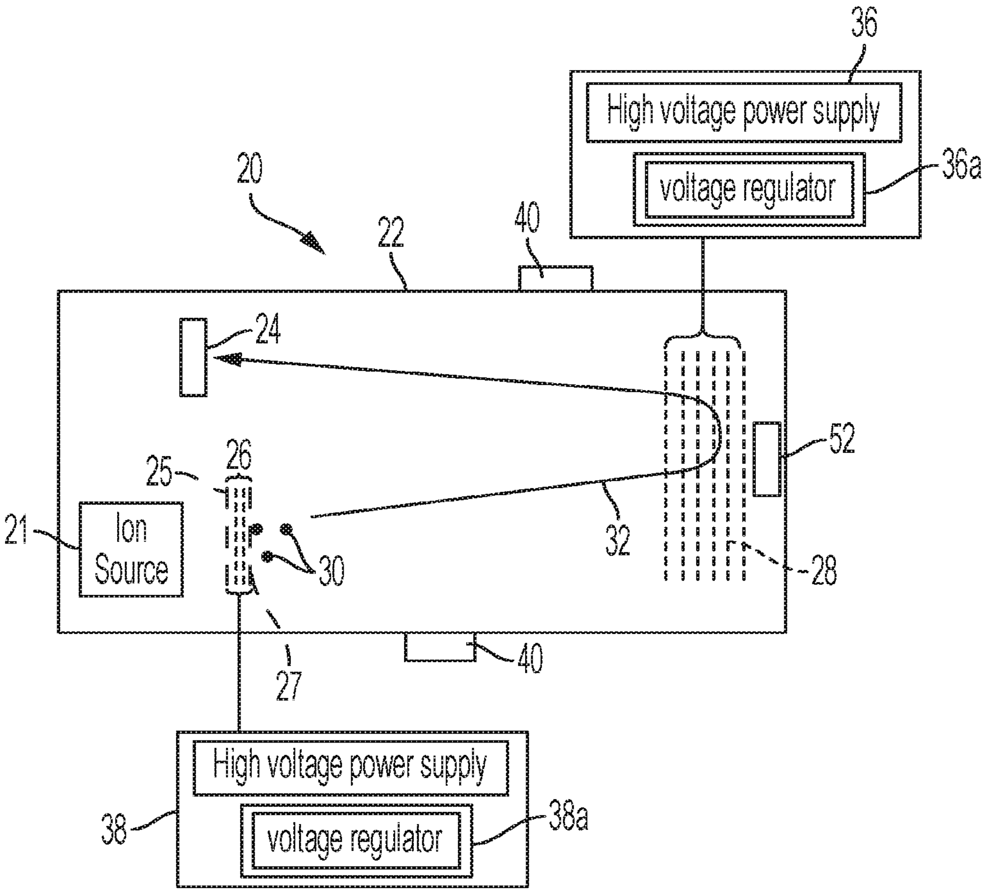

A voltage regulator according to the present teachings can be incorporated in a variety of different mass spectrometry systems. By way of example, U.S. Pat. No. 7,518,107, which is herein incorporated by reference in its entirety, discloses a time-of-flight mass spectrometer that can be modified in accordance with the present teachings to include voltage regulator(s) disclosed herein. FIG. 4 schematically depicts such a time-of-flight mass spectrometry system 20 according to an embodiment, which includes an ion source 21 having a sample support 25 from which ions are desorbed, one or more ion detectors 24, 52 and ion optic components comprising an electrostatic ion accelerator 26 and an electrostatic mirror 28, which are located within a vacuum housing 22. Temperature sensors 40 can be mounted on various locations of the flight path assembly for providing temperature measurements.

With continued reference to FIG. 4, the time-of-flight mass spectrometer 20 further includes high-voltage power supplies 36 and 38 that can be connected to the accelerometer 26 and mirror 28, respectively, to apply voltages thereto, for accelerating and deflecting the ions. In this embodiment, the high-voltage power supplies 36 and 38 include high-voltage regulators 36*a* and 38*a* according to the present teachings for regulating high voltage generated by these power supplies.

In use, ions can be produced in the ion source 21 and a pulse of ions 30 can be accelerated through an electric field presented by the accelerometer 26 through the application of an electrostatic potential between the sample support 25 and a second electrode 27. The pulse of ions 30 fly a fixed distance, commonly referred to as the flight distance, to the detector 24 and the detector produces corresponding signals at the times that ions arrive. In some embodiments, the flight distance can be the distance defined by the path from the sample support 25 to the detector 52 with no voltage applied to the mirror 28.

Those having ordinary skill in the art will appreciate that various changes can be made to the above embodiments without departing from the scope of the invention.

What is claimed is:

1. A voltage regulator, comprising:

a first voltage regulator unit configured for regulating a voltage generated by a positive high voltage source, a second voltage regulator unit configured for regulating a voltage generated by a negative high voltage source, a polarity switch for connecting said first and second voltage regulator units to said positive and negative high voltage sources, respectively, and an output voltage port for receiving a regulated positive and negative high voltage from said first and said second voltage regulator units, respectively, wherein each of said voltage regulator units comprises:

a voltage-regulating transistor configured to regulate one of said positive and negative polarity voltages, a Zener diode connected in parallel to said voltage-regulating transistor so as to provide a low impedance bypass path around said voltage-regulating transistor when the voltage-regulating transistor is coupled via said polarity switch to one of said voltage sources providing a voltage having a polarity opposite to the voltage polarity associated with said voltage-regulating transistor, and for each of said first and second voltage regulator units, a feedback path extending from said output voltage port to a base of the voltage-regulating transistor associated with said voltage regulator unit for modulating a current applied to said base so as to adjust conductivity of said voltage-regulating transistor and hence an output voltage generated at said output voltage port.

2. The voltage regulator of claim 1, wherein any of said first and said second voltage regulator units comprises at least one shunt transistor disposed between the base of the voltage-regulating transistor of that voltage regulator unit and the ground.

3. The voltage regulator of claim 2, wherein a base of said at least one shunt transistor is coupled to said output voltage port via a respective one of said feedback paths to allow application of a feedback signal to said base of the at least one shunt transistor.

4. The voltage regulator of claim 3, wherein said at least one shunt transistor comprises a plurality of shunt transistors coupled in series to one another.

5. The voltage regulator of claim 4, wherein said respective feedback path is coupled to a base of a last one of said plurality of shunt transistors, said last shunt transistor being coupled directly or via one or more resistors to the ground.

6. The voltage regulator of claim 5, further comprising a resistive voltage divider electrically disposed between an input port of said voltage-regulating transistor and the ground.

7. The voltage regulator of claim 6, wherein said resistive voltage divider comprises a plurality of resistors coupled in series.

8. The voltage regulator of claim 7, wherein a base of each of said plurality of shunt transistors that are coupled in series, other than a base of said last shunt transistor, is electrically coupled to a junction between two of said plurality of resistors of said resistive voltage divider such that a fraction of a voltage applied to an input port of the voltage regulating transistor is applied to said base of that shunt transistor.

9. The voltage regulator of claim 8, further comprising a first diode disposed in series with said voltage divider and a second diode disposed in a path connecting the base of the voltage-regulating transistor to ground, said diodes being configured to activate and deactivate said voltage-regulating transistor and said shunt transistors based on polarity of voltage at said output voltage port.

10. The voltage regulator of claim 1, further comprising a resistive voltage divider for receiving an output voltage of any of said first and second voltage regulating units and providing a fraction of said received voltage at said output voltage port.

11. The voltage regulator of claim 1, further comprising a pair of comparators each of which is associated with one of said feedback paths, wherein each of said comparators is configured to compare an output voltage at said output voltage port with a predefined voltage and to generate a feedback signal based on that comparison.

12. The voltage regulator of claim 1, further comprising a first high-voltage control circuit for controlling said positive high-voltage source and a second high-voltage control circuit for controlling said negative high-voltage source.

13. A voltage regulator for use in a mass spectrometry system, comprising:

a first voltage regulator unit having a first voltage-regulating transistor configured for regulating a voltage generated by a positive high-voltage source, a second voltage regulator unit having a second voltage-regulating transistor configured for regulating a voltage generated by a negative high-voltage source, a polarity switch for connecting said first and second voltage regulator units to said positive and negative high voltage sources, respectively, an output voltage port for receiving a regulated positive and negative high voltage from said first and said second voltage regulator units, respectively, a first shunt regulator configured for controlling said first voltage regulator unit, a second shunt regulator configured for controlling said second voltage regulator unit, a first feedback path extending from said output voltage port to said first shunt regulator for providing a first feedback signal thereto, wherein said first shunt regulator is configured to adjust conductance of said first voltage-regulating transistor in response to said feedback signal so as to regulate said positive voltage at said output voltage port, and a second feedback path extending from said output voltage port to said second shunt regulator for providing a second feedback signal thereto, wherein said second shunt regulator is configured to adjust conductance of said second voltage-regulating transistor in response to said feedback signal so as to regulate said negative voltage at said output voltage port.

14. The voltage regulator of claim 13, wherein said first shunt regulator comprises a plurality of transistors connected in series between a base of said first voltage-regulating transistor and the ground.

15. The voltage regulator of claim 14, wherein said second shunt regulator comprises a plurality of transistors connected in series between a base of said second voltage-regulating transistor and the ground.

16. The voltage regulator of claim 15, wherein said first shunt regulator further comprises a first voltage divider connected between an input port of said first voltage-regulating transistor and ground for applying to each of a subset of said transistors of the first shunt regulator a different fraction of a voltage applied to the input port of said first voltage-regulating transistor.

17. The voltage regulator of claim 16, wherein said second shunt regulator comprises a second voltage divider connected between an input port of said second voltage-regulating transistor and ground for applying to each of a subset of said transistors of the second shunt regulator a different fraction of a voltage applied to the input port of said second voltage-regulating transistor.

18. The voltage regulator of claim 16, further comprising a first diode disposed between the base of said first voltage-regulating transistor and said plurality of transistors of the first shunt regulator so as to activate and deactivate said first voltage-regulating transistor based on a voltage at said output voltage port.

19. The voltage regulator of claim 18, further comprising a second diode disposed in series with said first voltage divider and configured to activate and deactivate said transistors of the first shunt regulator based on the voltage at said output voltage port.

20. The voltage regulator of claim 19, further comprising a third diode disposed between the base of said second voltage-regulating transistor and said plurality of transistors of the second shunt regulator so as to activate and deactivate said second voltage-regulating transistor based on the voltage at said output voltage port, and optionally, further comprising a fourth diode disposed in series with said second voltage divider for activating and deactivating the transistors of said second shunt regulator based on the voltage at said output voltage port.

* * * * *